United States Patent

Iida et al.

[11] Patent Number: 5,292,196
[45] Date of Patent: Mar. 8, 1994

[54] OPTICAL FIBER TYPE TEMPERATURE DISTRIBUTION MEASURING APPARATUS

[75] Inventors: Osamu Iida; Yuuichi Ushizima, both of Kurashiki, Japan

[73] Assignee: Kawasaki Steel Corporation, Hyogo, Japan

[21] Appl. No.: 18,570

[22] Filed: Feb. 17, 1993

[51] Int. Cl.$^5$ .......................... G01J 5/10; G01N 21/65
[52] U.S. Cl. ................................. 374/131; 374/161; 385/16
[58] Field of Search ............... 374/131, 161; 356/73.1; 250/227.14; 385/16

[56] References Cited

U.S. PATENT DOCUMENTS

| | | | |
|---|---|---|---|
| 4,767,219 | 8/1988 | Bibby | 374/131 X |
| 4,823,166 | 4/1989 | Hartog | 374/131 X |
| 4,984,884 | 1/1991 | Ryu et al. | 356/73.1 |
| 5,102,232 | 4/1992 | Tanabe et al. | 250/227.14 X |

OTHER PUBLICATIONS

"Raman Scattering Light Utilized Distribution Type Temperature Sensor", Sensor Technology, vol. 9, No. 7, pp. 30–34, May 1989.

*Primary Examiner*—Daniel M. Yasich
*Attorney, Agent, or Firm*—Oliff & Berridge

[57] ABSTRACT

An optical switch (14) is disposed with in a measuring section (3) and connected to a base portion of an optical fiber (2). The optical switch (14) includes a pair of adjusting optical fibers (15, 16) having lengths different from each other by a half of a distance resolution, and the optical switch (14) is driven by a pulse driving circuit (4) in synchronism with a semiconductor laser (5) which emits a light pulse. When the optical switch (14) is driven, either one of the adjusting optical fibers (15, 16) is selectively connected to the optical fiber (2) so that two detection routes having different lengths are formed. The temperature distribution measurement values respectively for the two detection routes and having a phase displaced from each other corresponding to the half of the distance resolution are calculated in a high speed averaging processing unit (11), and then a temperature distribution value along the optical fiber (2) is calculated in a data processing unit (12). Furthermore, a constant temperature tank (17) is disposed near the measuring section (3) to accommodate a predetermined segment of the optical fiber, and the temperature of the optical fiber (2) is maintained constant for the predetermined segment.

2 Claims, 5 Drawing Sheets

OPTICAL FIBER TYPE TEMPERATURE DISTRIBUTION MEASURING APPARATUS

BACKGROUND OF THE INVENTION

1. Field of the Invention

The present invention relates to an optical fiber type temperature distribution measuring apparatus for measuring a temperature distribution in an electric power facility, plants of various types, or the like by utilizing Raman scattering light, and in particular, to such an apparatus in which the spatial resolution (or distance resolution) is improved.

2. Description of the Prior Art

Recently, as described in an article "Raman scattering light utilized distribution type temperature sensor" (magazine "SENSOR TECHNOLOGY", Vol. 9, No. 7, May 1989, pp. 30 to 34), an optical fiber type temperature distribution measuring apparatus for simultaneously measuring temperatures at a multiplicity of positions by using a single optical fiber has been proposed. This apparatus utilizes a phenomenon in which the intensity ratio between a Stokes' line and an anti-Stokes' line which are two components of Raman scattering light changes sensitively depending on a temperature of an optical fiber. In the measurement, a light pulse is transmitted into the optical fiber, and a time (hereinafter referred to as a delay time) until Raman back scattering light returns to a transmitting end of the optical fiber is measured to determine a position at which the scattering light is generated. On the other hand, a temperature of the optical fiber at the position, that is, the position at which the optical fiber is installed is determined from the intensity ratio. Furthermore, by detecting the Raman back scattering light from respective positions along the optical fiber on the time division basis, the temperatures at respective positions along the optical fiber, that is, a temperature distribution along the optical fiber can be obtained. The principle of the measurement in this apparatus is illustrated in FIG. 5, and a waveform of the Raman scattering light is shown in FIG. 6, and a relationship between intensity ratio and temperature is shown in FIG. 7.

Specifically, as shown in a block diagram in FIG. 4, an optical fiber 2 is installed along an object 1 to be measured in an electric power facility, a plant or the like, and a light pulse 18 is transmitted into the optical fiber 2, within a measuring section 3, from a pulse semiconductor laser 5 which is driven by a pulse driving circuit 4. Subsequently, Raman back scattering light 19 from each position along the optical fiber 2 is received in the measuring section 3, and a Stokes' line and an anti-Stokes' line which are two components of the Raman back scattering light are split or separated by two types of interference filters 7 and 8 in an optical branching filter 6, and the intensities of the split Stokes' line and anti-Stokes' line are respectively photoelectrically converted by first and second avalanche photodiodes (APDs). Then, the intensities of these two components are A/D converted in a high speed averaging processing unit 11, and the A/D converted intensities are respectively stored in a memory at locations respectively corresponding to delay times. After all the Raman back scattering light 19 is returned from the optical fiber 2, a light pulse 18 is again transmitted into the optical fiber 2, and the detection of Raman back scattering light 19 is carried out, and the obtained intensities are stored by adding to the respective previously stored intensitites in the locations of the memory. After repeating these operations a predetermined number of times (for example, several thousands of times), the intensity values stored in each of the locations of the memory are divided by the number of times of the repetition to obtain an average value. The purpose of this processing for averaging is to prevent a measurement error from being introduced because of the very weak Raman back scattering light. Thereafter, in the high speed processing unit 11, the intensity ratio is obtained for each of the positions on the basis of the average intensity values of the Stokes' line and the anti-Stokes' line, and the obtained intensity ratios are delivered to a data processing unit 12. In the data processing unit 12 temperature distribution information is obtained on the basis of the intensity ratio at each of the positions along the optical fiber 2. The temperature distribution information is displayed on a screen of a display 13. In this respect, in obtaining the temperature from the intensity of ratio between the Stokes' line and the anti-Stokes' line, a map prepared beforehand by experiments and calculations is used.

However, in such a prior art optical fiber type temperature measuring apparatus, the following problems are involved.

In the prior art apparatus mentioned above, the temperature of the object 1 to be measured is measured as an average value in each segment corresponding to a light pulse width. For this reason, in order to measure the temperature distribution accurately, it is necessary to enhance the spatial resolution by narrowing the light pulse width and by shortening a time width for enabling time division (sampling time interval). However, to narrow the light pulse width means a reduction of data which is averaged, and this naturally results in a deterioration of the accuracy of temperature measurement. Considering these situations, the practical light pulse width, that is, the spatial resolution, has been selected to be about 1 meter. Accordingly, the prior art apparatus cannot be applied to measure an object which requires a spatial or distance resolution which is less than 1 m. In this case, a conventional apparatus employing a thermocouple had to be used.

SUMMARY OF THE INVENTION

The present invention was made in view of the problems mentioned above, and it is an object to provide an optical fiber type temperature distribution measuring apparatus capable of improving the spatial resolution in the measurement of the temperature distribution without deteriorating the accuracy of temperature measurement.

In order to solve the above and other problems, an optical fiber type temperature distribution measuring apparatus according to the present invention, wherein a light pulse is transmitted into an optical fiber installed in an object to be measured, and a temperature distribution value representing a series of segment average temperatures of the optical fiber is measured on the basis of the intensity of Raman back scattering light and a time until the Raman back scattering light returns, includes light pulse oscillating means for oscillating the light pulse having a predetermined pulse width, selective switching means provided at a light pulse transmitting side of the optical fiber and including a plurality of fiber length adjusting optical fibers respectively having different lengths so that a mutual phase difference is smaller than a distance resolution in temperature measurement, the selective switching means selectively connecting the plurality of fiber length adjusting optical fibers to the optical fiber to form a plurality of detection routes having different lengths, and calculating means for calculating a plurality of temperature distribution measurement values respectively corresponding to the plurality of detection routes, and for calculating a temperature distribution measurement value representing a series of temperature values of respective subsegments of the optical fiber, a plurality of the subsegments corresponding to a segment which corresponds to the distance resolution.

In another aspect of the present invention, a constant temperature tank is further provided at the light pulse transmitting side of the optical fiber, and the constant temperature tank maintains the optical fiber at a predetermined temperature for a range of the fiber longer than at least the distance resolution in the temperature measurement.

In the apparatus in the present invention, two systems of detection routes, having lengths different from each other by a half of the length corresponding to the distance resolution in the temperature measurement, or a half of the light pulse width, are used. The calculating means first calculates the temperature distribution measurement values of the segments of the two systems at respective transmitting end portions, and thereafter, the temperature distribution measurement value of a subsegment which is a half of the segment and which does not overlap the segment of the other system is calculated. Then, based on this temperature distribution measurement value and the temperature distribution measurement value of the next segment, the temperature distribution measurement value of the next half of the segment (subsegment) is calculated. In this manner, by repeating a similar precessing, two times of the spatial resolution can be obtained while measuring by using the same light pulse width as that in the prior art. Furthermore, when the constant temperature tank is provided, the temperature of the optical fiber within the constant temperature tank can be used as a reference value in calculating the temperature values of the succeeding subsegments.

DESCRIPTION OF THE PREFERRED EMBODIMENT

Figure 1:
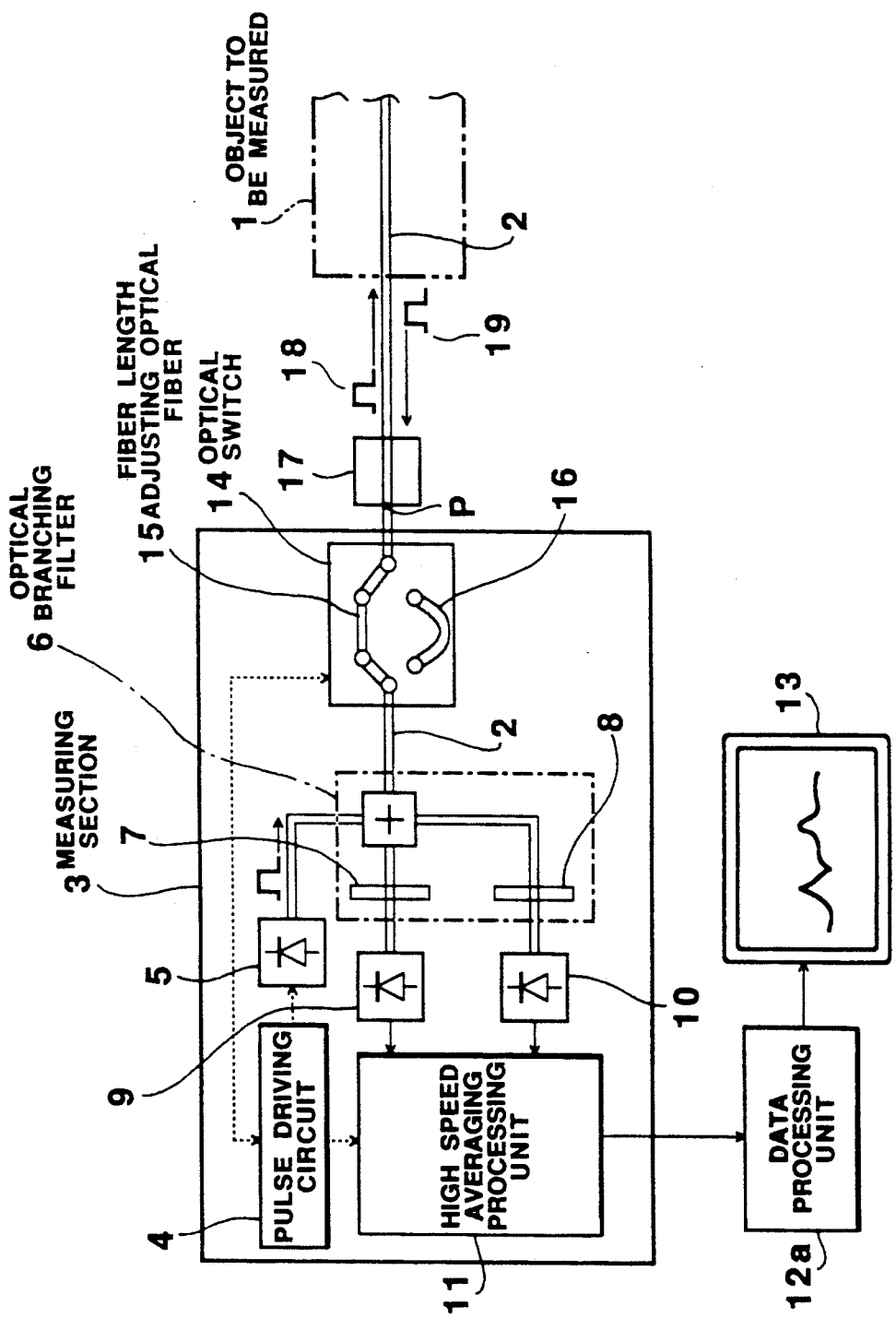
FIG. 1 is a block diagram of an optical fiber type temperature distribution measuring apparatus in an embodiment of the present invention.

The embodiment of the present invention will be described with reference to the drawings. Like reference numerals designate like or corresponding parts throughout the drawings.

With reference to FIG. 1, similar to the prior art apparatus, a pulse driving circuit 4 for oscillating a light pulse, and a pulse semiconductor laser (hereinafter referred to as LD) 5 are provided in a measuring section 3, and a light pulse 18 emitted by the LD 5 is transmitted into an optical fiber 2 through an optical branching filter 6. However, in the present embodiment, within the measuring section 3 and at a base portion of the optical fiber 2, there is provided with an optical switch 14 as a selective switching means, and this optical switch 14 is driven in synchronism with the LD 5 by the pulse driving circuit 4. The optical switch 14 includes a pair of fiber length adjusting optical fibers 15 and 16 having lengths different from each other, for example, by a half (0.5 m) of a distance resolution which is equal to a pulse width (1 m in the present embodiment) of the light pulse 18. In other words, a mutual phase difference of the fiber length adjusting optical fibers is smaller than the distance resolution. When the optical switch 14 is driven, either one of the fiber length adjusting optical fibers 15 or 16 is instantly connected to the optical fiber 2. Accordingly, in the apparatus of the present embodiment, two types of optical fibers 2 (i.e. detection routes) having lengths different from each other by 0.5 m are provided. In the present embodiment, a shorter detection route is referred to as a first route, and a longer route is referred to as a second route.

On the other hand, in the vicinity of the measuring section 3, there is disposed a constant temperature tank 17 for accommodating a part of the optical fiber 2, and the temperature of the optical fiber 2 is maintained constant in a predetermined segment (1 m in the present embodiment). The optical fiber 2 exiting from the constant temperature tank 17 is installed along an object 1 to be measured similar to the prior art apparatus.

Furthermore, two types of interference filters 7 and 8 built in the optical branching filter 6, first and second avalanche photodiodes (hereinafter referred to as APD) 9 and 10, and a high speed averaging processing unit 11 are also provided in the measuring section 3, and these parts are similar to that in the prior art apparatus. A data processing unit 12a as a calculating means, and a display 13 are provided at the outside of the measuring section 3. As compared with the data processing unit 12 in the prior art apparatus, a data processing unit 12a in the embodiment calculates two temperature distribution measurement values which are displaced in phase from each other, on the basis of the intensity ratio between a Stokes' line and an anti-Stokes' line at each position along the first and second routes delivered from the measuring section 3, and further, based on the two temperature distribution measurement values respectively for the first and second routes, calculates a temperature distribution value consisting of a series of temperature values of respective subsegments, each of the subsegments equals a half of the segment corresponding the pulse width.

The operation of this embodiment will be described.

In the measurement of the temperature distribution along the optical fiber 2, first, the LD 5 and the optical switch 14 are driven by the light pulse driving circuit 4 to transmit light pulses successively and at the same time, the detection routes are switched between the first route and the second route.

For example, first, when a light pulse 18 is transmitted to the first route, a scattering is caused at each position along the optical fiber 2, and back scattering light returns to the transmitting end of the optical fiber 2. A Stokes' line and an anti-Stokes' line, which are two components of the back scattering light are split or separated by the two types of interference filters 7 and 8, and photoelectrically converted respectively by the first and second APDs 9 and 10. Subsequently, in the high speed averaging processing unit 11, the intensities of the two components are A/D converted and stored in locations in a memory respectively corresponding to delay times. The procedure described above is similar to that in the prior art apparatus. However, in the present embodiment, after all the back scattering light from the first route is returned, a light pulse is transmitted to the second route, and in a similar procedure, the intensities of the two components are stored by adding to the previous respective intensities in the memory in the high speed averaging processing unit 11. After repeating the above-mentioned operation for a multiplicity of times, the intensities are divided by the number of times of the repeated operations to perform an averaging processing for each of the first and second routes. Subsequently, the intensity ratio between the intensity of the Stokes' line and the intensity of the anti-Stokes' line is obtained for each position and for each of the first and second routes.

Figure 2:
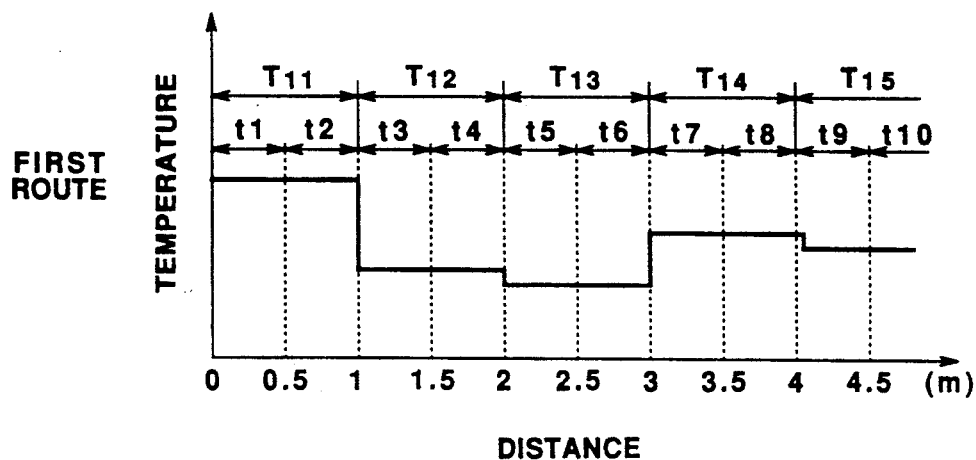
FIG. 2 is a graph of a temperature distribution measurement value in the embodiment.
Figure 3:
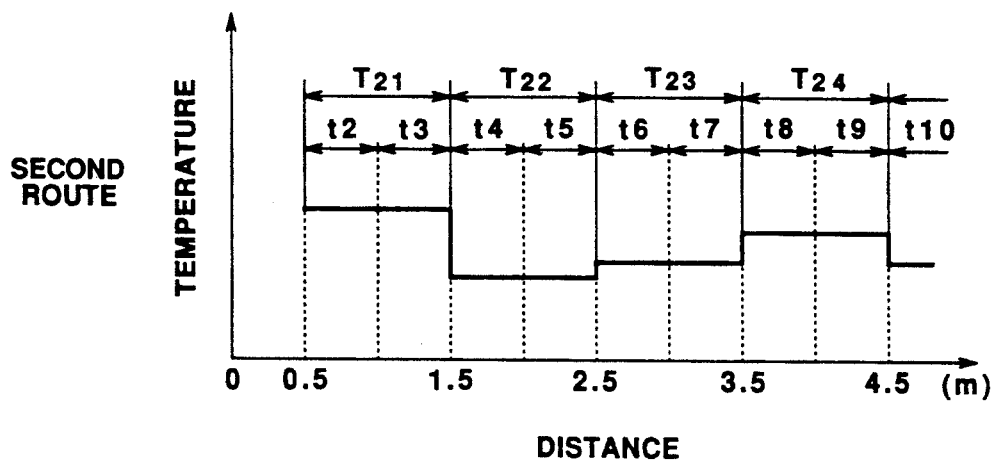
FIG. 3 is a graph of a temperature distribution measurement value in the embodiment.
Figure 4:
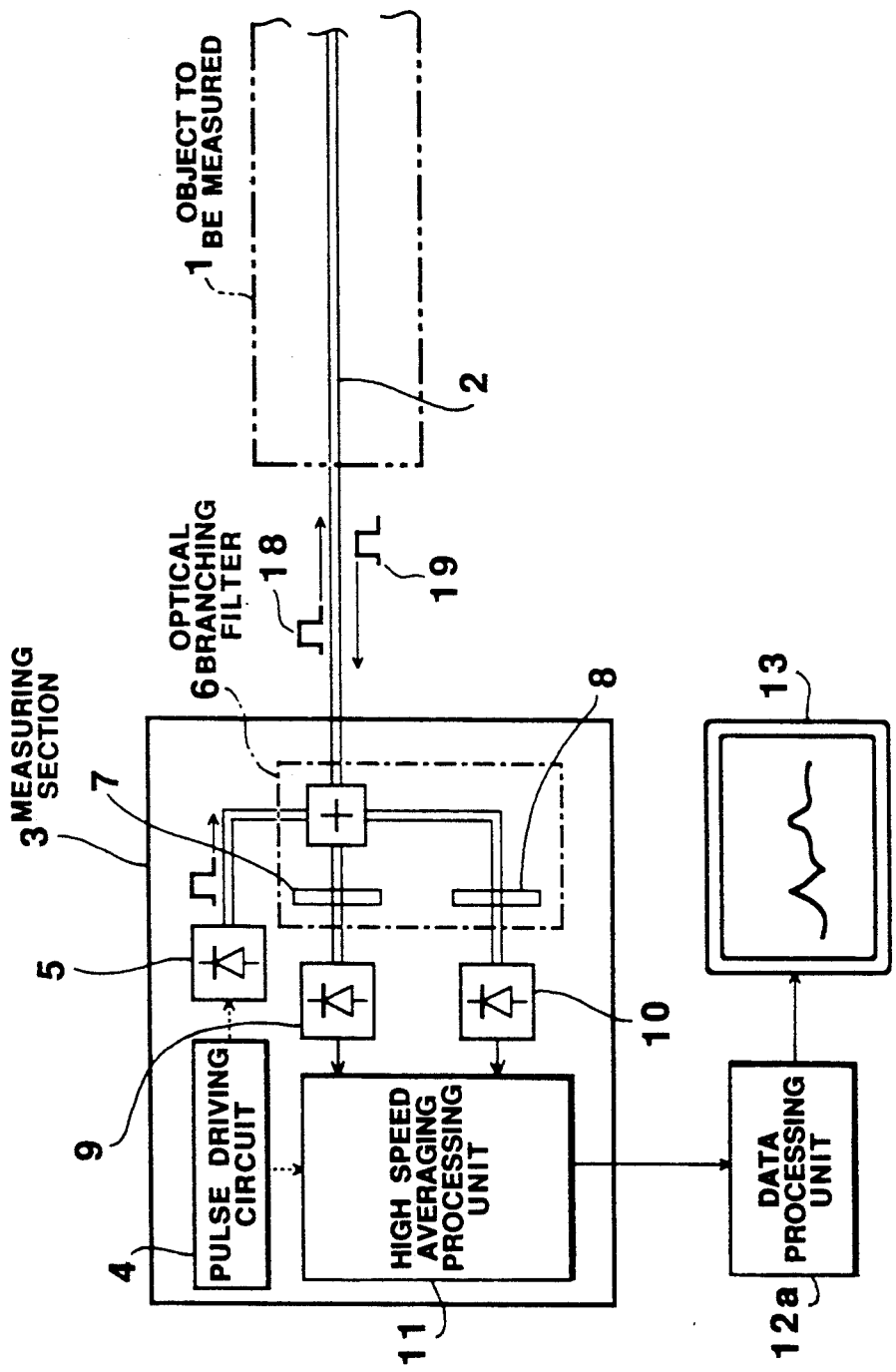
FIG. 4 is a block diagram of an optical fiber type temperature distribution measuring apparatus in the prior art.
Figure 5:
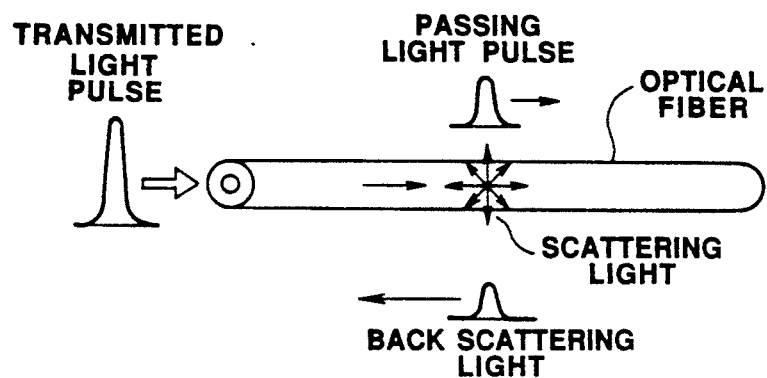
FIG. 5 is a schematic view illustrating the principle of the operation of the optical fiber type temperature distribution measuring apparatus.
Figure 6:
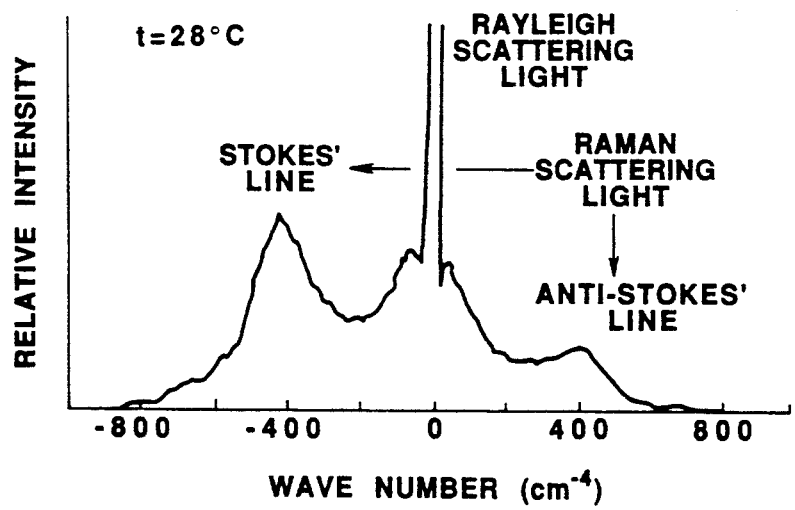
FIG. 6 is a diagram of a waveform of Raman scattering light.
Figure 7:
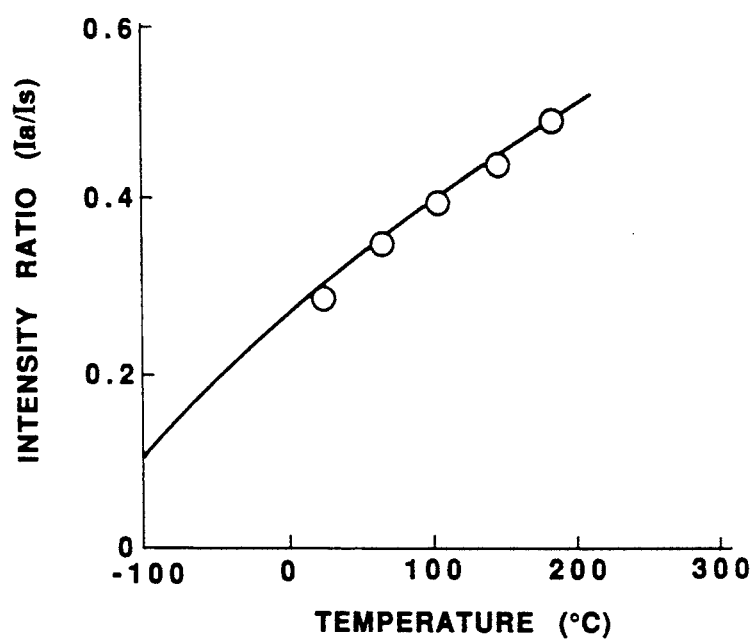
FIG. 7 is a graph of a relationship between intensity ratio and temperature.

Thereafter, in the data processing unit 12, two temperature distribution measurement values respectively for the first and second routes as shown in FIGS. 2 and 3 are produced based on the intensity ratios delivered from the measuring section 3. These two temperature distribution measurement values respectively for the first and second routes are phase displaced by 0.5 m due to the difference in the route lengths. The measurement starting point in FIGS. 2 and 3, that is, a reference point "0" in the distance is selected at an entrance of the constant temperature tank 17, a point P in FIG. 1. In this case, the determination of the measurement starting point is made by calculating a delay time of the back scattering light based on a velocity L of the light pulse in the optical fiber 2 and a distance between the LD 5 and the constant temperature tank 17. Furthermore, the characters $T_{11}$, $T_{12}$, $T_{13}$, . . . in FIG. 2 represent segment average temperatures of a series of segments in the first route, each of the segments corresponding to 1 m, and the characters $T_{21}$, $T_{22}$, $T_{33}$, . . . in FIG. 3 represent segment average temperatures of a series of segments in the second route, each of the segments corresponding to 1 m. The characters t1, t2, t3, . . . in FIGS. 2 and 3 represent subsegment average temperatures of a series of subsegments in the first and second routes, each of the subsegments corresponding to 0.5 m or a half of the segment, however, at this stage, these subsegment average temperatures are not yet known.

Subsequently, in the data processing unit 12, the subsegment average temperature of each subsegment of 0.5 m is calculated on the basis of the two temperature distribution measurement values each consisting of the series of segment average temperatures of 1 m segments. Firstly, a first and a second subsegment average temperature t1 and t2 are calculated. In the first route, since the segment of 0 to 1 m is within the constant temperature tank 17 as described above, the temperature is maintained at the constant value. Accordingly, both the subsegment average temperatures t1 and t2 are equal to the segment average temperature $T_{11}$, and thus, $t1 = t2 = T_{11}$.

Next, in the data processing unit 12, the subsegment average temperature t3 is calculated. In the second route, since the segment average temperature $T_{21}$ of the segment of 0.5 to 1.5 m is an average value of the subsegment average temperature t2 and t3, $T_{21} = (T2 + t3)/2$, and thus, $t3 = 2T_{21} - t2$. Here, since $t2 = T_{11}$, it is obtained that $t3 = 2T_{21} - T_{11}$. Furthermore, in a similar procedure, the subsegment average temperatures t4 can be obtained from the segment average temperature $T_{12}$ of the segment of 1 to 2 m in the first route and subsegment average temperature t3. In other words, $T_{12} = (t3 + t4)/2$, and thus, $t4 = 2T_{12} - t3 = 2T_{12} - 2T_{21} + T_{11}$.

Likewise, after obtaining the subsegment average temperatures t5, and so on, suquentially, the data processing unit 12 forms temperature distribution information from these subsegment average temperatures t1, t2, t3, . . . , and this temperature distribution information is displayed on a screen of the display 13.

As described above, in the apparatus in the present invention, by providing the optical switch 14 incorporating therein the two fiber length adjusting optical fibers 15 and 16, and the constant temperature tank 17, it is possible to obtain the spatial or distance resolution as large as two times the spatial or distance resolution in the prior art apparatus. However, the present invention is not limited to this embodiment. For example, when the number of routes is increased by incorporating three or more fiber length adjusting optical fibers in the optical switch 14, it is possible to further enhance the spatial resolution. Furthermore, in the present invention, although the constant temperature tank 17 is used as a reference in dividing the optical fiber into the segments, it is also possible as a reference for temperature correction. Moreover, so long as the temperature is stable, a test room or the like may be used as the constant temperature tank. Furthermore, in the present embodiment, although it is described as to the case wherein the distance resolution is equal to the pulse width of the light pulse which is emitted from the semiconductor laser, the present invention is not limited to this, and an arbitrary distance resolution which is determined from a light pulse width and a time interval which is feasible for time division (sampling) may be used.

By virtue of the arrangement as described above, the present invention provides the following advantages.

In the optical fiber type temperature distribution measuring apparatus in the present invention, a plurality of temperature distribution measurement values with their phases displaced from each other are obtained by switching a plurality of routes by the optical switch, and based on these values, a temperature distribution measurement value including a series of subsegment average temperatures is obtained, in which each segment corresponding to the distance resolution in the temperature measurement is divided into a plurality of subsegments. As a result, the spatial resolution in the temperature distribution measurement is improved without deteriorating the temperature measurement accuracy and without modifying the prior art apparatus to a great extent, and the application field of the apparatus can be extended significantly. Furthermore, when the constant temperature tank is provided, the temperature of the optical fiber within the constant temperature tank is used as a reference value in dividing into the segments, and the calculation of the temperature distribution measurement value can be achieved with a very high accuracy.

What is claimed is:

1. An optical fiber type temperature distribution measuring apparatus, wherein a light pulse is transmitted into an optical fiber installed in an object to be measured, and a temperature distribution value representing a series of segment average temperatures of the optical fiber is measured on the basis of the intensity of Raman back scattering light and a time until the Raman back scattering light returns, said optical fiber type temperature distribution measuring apparatus comprising:

light pulse oscillating means for oscillating the light pulse having a predetermined pulse width;

selective switching means provided at a light pulse transmitting side of the optical fiber and including a plurality of fiber length adjusting optical fibers respectively having different lengths so that their mutual phase difference is smaller than a distance resolution in temperature measurement, said selective switching means selectively connecting the plurality of fiber length adjusting optical fibers to the optical fiber to form a plurality of detection routes having different lengths; and calculating means for calculating a plurality of temperature distribution measurement values respectively corresponding to the plurality of detection routes, and for calculating a temperature distribution value representing a series of temperature values of respective subsegments of the optical fiber, a plurality of the subsegments corresponding to a segment which in turn corresponds to the distance resolution.

2. An optical fiber type temperature distribution measuring apparatus according to claim 1, further comprising:

a constant temperature tank located at a downstream side of said selective switching means, for maintaining a temperature of a range of the optical fiber at a predetermined temperature, said range being at least longer than the distance resolution in the temperature measurement.

* * * * *